3,389,129
PROCESS FOR THE POLYMERIZATION OF OLEFINIC HYDROCARBONS IN THE PRESENCE OF ALUMINIUM ALKYL DIHALIDE OR SESQUIHALIDE, TITANIUM HALIDE AND A PHOSPHORUS OXYHALIDE
Noboru Yamada, Tadashi Watanabe, and Yoshiyuki Yamanaka, Iwakuni-shi, Yamaguchi-ken, Japan, assignors to Teijin Limited, Osaka, Japan, a corporation of Japan
No Drawing. Filed July 29, 1963, Ser. No. 298,475
Claims priority, application Japan, Aug. 3, 1962, 37/33,266; Jan. 11, 1963, 38/1,153
5 Claims. (Cl. 260—93.7)

This invention relates to the polymerization of olefinic hydrocarbons.

The object of this invention is to provide improved olefinic hydrocarbon polymers by polymerizing olefinic hydrocarbons using a novel three-component catalyst.

It is known that olefinic hydrocarbons such as ethylene, propylene, butene-1, 4-methylpentene-1 and styrene, either singly or as mixtures, polymerize to yield crystalline polymers when contacted with a catalyst prepared by reacting a transition metal compound with a reducing metal, a metal hydride, or an organometallic compound, in the optional presence of an inert organic solvent.

For example, it is known that propylene gives a crystalline polymer of high so-called stereospecific property when polymerized with the use of a mixed catalyst of triethyl aluminium or diethyl aluminium chloride with titanium trichloride. However, a catalyst system composed of, for example, ethyl aluminium dichloride with titanium trichloride has very little ability to assist in the aforesaid stereospecific polymerization, and therefore the catalyst is virtually ineffective as that for so-called stereospecific polymerization.

The invention is based on the discovery that with the use of a complex catalyst composed of an organic aluminium halide selected from the group consisting of organic aluminium dihalides and organic aluminium sesquihalides; a titanium halide; and a phosphoryl halide of the formula $$POX_3 \qquad (I)$$

wherein X represents a halogen atom, or an organo-phosphonyl halide of the general formula $$RPOX_2 \qquad (II)$$

wherein R represents a hydrocarbon group of 1–12 carbons, and is alkyl, cycloalkyl, aralkyl or aryl, and X stands for a halogen atom a stereospecific polymer which heretofore could not be obtained with the use of catalysts composed of alkyl-aluminium-dihalide-titanium halide can be obtained.

In the present specification, said phosphoryl halide and the organo phosphonyl halide are hereafter referred to collectively as oxy-phosphorus compounds.

The present polymerization is characterized by the use of three-component catalysts as described hereinbelow, different from heretofore used Ziegler type two-component mixed catalyst. Namely, a complex catalyst composed of, in a mixture, as the first component an organic aluminium halide selected from the group consisting of organic aluminium dihalides and organic aluminium sesquihalides, and as the second component a titanium halide, and as the third component a phosphoryl halide or an organo-phosphonyl halide or their mixture.

The organic radical of the first component compounds denotes a hydrocarbon of 1–12 carbons, and can stand for an alkyl, cycloalkyl, aralkyl or aryl radical, etc., particularly ethyl, propyl, butyl or isobutyl radicals being preferred. The halogen atom stands for fluorine, chlorine, bromine and iodine, particularly chlorine and bromine being preferred. For example, ethyl aluminium dichloride, ethyl aluminium dibromide, n-propyl aluminium diiodide, isobutyl aluminium dichloride, n-octyl aluminium dichloride, phenyl aluminium dichloride, benzyl aluminium dichloride, methyl aluminium sesquichloride, ethyl aluminium sesquichloride, etc. may be used.

Said "organic aluminium sesquihalides" used as the first component means the compounds represented by the formula $$Al_2R_3X_3 \text{ or } AlR_{1.5}X_{1.5}$$

wherein X stands for a halogen atom, and R represents a hydrocarbon group.

In this invention, said organic aluminium dihalides, said organic aluminium sesquihalides, or their mixtures are used as the first component.

The titanium halides to be used as the second component may be a halide of any of tetravalent, trivalent or divalent titanium, particularly titanium tetrachloride, titanium trichloride, titanium dichloride, titanium tetrabromide, and titanium tetraiodide being preferred.

Again the phosphoryl halide to be used as the third component may be any of the compounds represented by the formula $$POX_3 \qquad (I)$$

wherein X stands for a halogen, particularly, for example, phosphoryl chloride and phosphoryl bromide being preferred.

As the third component, not only said phosphoryl halides, but also organo-phosphonyl halides represented by the formula $$RPOX_2 \qquad (II)$$

wherein R and X mean the same as explained before are useful, among which particularly ethyl phosphonyl dichloride, n-butyl phosphonyl dichloride, phenyl phosphonyl dichloride, and ethyl phosphonyl dibromide being preferred.

In this invention, according to the type of monomer to be polymerized, a suitable combination can be made by selecting each one substance from the said three components so that the polymerization may be carried out with advantage. Again in this invention it is also possible to select, not each one substance from the three components, but each two or more substances from the three components, to form the combination catalyst.

One important advantage of this invention is that, even in case a mixed catalyst of the first and second components does not give a crystalline polymer of the olefin, by the addition of the third component to the catalyst a crystalline polymer can be obtained at a high yield. Again, in case a mixed catalyst of the first and the second components only produces oily products or a small amount of a solid polymer of low crystallinity, then if the third component is added to the mixed catalyst the yield and/or crystallinity of the solid polymer can be greatly improved.

That is, when combination catalysts composed of the first and second components without any oxy-phosphorus compound as the third component, for example, a catalyst composed of ethyl aluminium dichloride and titanium trichloride, is used for polymerization of propylene, oily or waxy polymers can be obtained, but crystalline polymer cannot be produced.

However, when a catalyst prepared by addition of the third component to the mixture of the first and the second components in accordance with this invention is used, a large amount of crystalline polymer is obtained.

Again a mixed catalyst composed of ethyl aluminium sesquichloride and titanium trichloride has a low degree of activity, and when used for polymerization of propylene, gives only a polymer of low stereospecific property.

Whereas, a catalyst wherein the third component is added to the mixture of the said two components enables the production of highly stereospecific polymer at a high yield.

The catalysts of this invention can be obtained by mixing the aforesaid first, second, and third components at a temperature ranging from −50−+200° C., in the optional presence of an organic, inert solvent. The permissible mixing temperature being of a wide range as aforesaid, it is convenient from the standpoint of ease of operation that the mixing be carried out at room temperature, and generally it is preferred that an organic, inert solvent be used at that time.

The suitable mixing ratio of the three components of the catalyst is: between the organic aluminium halide and the titanium halide, the mol ratio of aluminium to titanium is 0.1–10; and between the third component to the organic aluminium halide, the mol ratio of phosphor to aluminium is within the range of 0.1–1.0, preferably 0.2–0.8.

If the third component is added in an amount greater than said 1.0 to the organic aluminium halide, a reverse effect is brought about, that is, the polymerization of the olefinic hydrocarbons is prevented. If the mol ratio is lower than 0.1, the effect of the third component is hardly recognizable.

If the present process is explained taking an example of polymerization of propylene, it is as follows. In an inert organic solvent such as n-heptane, titanium trichloride, ethyl aluminium dichloride, and phosphoryl chloride are mixed. This operation is carried out in an atmosphere of an inert gas such as nitrogen, in order to avoid contact with air. The catalyst prepared by the mixing of the three components is a solid, and dispersed and suspended in the inert organic solvent. The same is charged to a polymerization reactor with propylene and a suitable inert solvent, and reacted under suitable range of temperature and pressure. The temperature is 0° C.–250° C., preferably 20–100° C., and the pressure may range from normal to 100 atmospheres. As the inert organic solvent, n-hexane, n-heptane, n-octane, cyclohexane, benzene, toluene, monochlorobenzene, etc. may be used, whereas of course the inert organic solvent is not limited to those above-named. As the inert organic solvent, also hydrocarbons which are gaseous under normal pressure, such as propane and n-butane may be used. Again the monomer itself may also be used as the inert organic solvent. In such a case it is feasible that the polymerization reaction is carried out without separate addition of a solvent.

The mixture completing the polymerization reaction can be refined by a treatment with, for example, an alcohol or water to decompose and remove the catalyst.

The polymerization process of the invention can be carried out batchwise or in continuous process.

Normally as a criterion of stereospecific property of polypropylene, the polymer is extracted with boiling n-heptane, and the weight percent of the insoluble matter is measured. The measured value is called isotacticity index (hereafter shall be abbreviated as I.I.). Polypropylenes heretofore obtained with the use of the conventional Ziegler type two-component catalyst generally has a low I.I. as aforesaid, and they must be extracted to be removed of amorphous portions before used as the materials for shaping.

In contrast, the polypropylene prepared with the use of the three-component catalyst of the invention, that is, the mixed catalyst of an organic aluminium halide, a titanium halide, and an oxy-phosphorus compound, has an I.I. of about 90 or more as seen from the examples, and can be used as a material for shaping as it is, without any preceding extraction step, to give a shaped article of excellent mechanical strength.

The structure of the conventional Ziegler type catalyst and the formation mechanism of the isotactic polymer is not yet completely understood. According to one theory, it is said that the organic aluminium compound and the titanium halide form a coordination complex compound, of which solid surfaces having a structure suitable for isotactically coordinating, for example, propylene. If the theory is correct, it may be suggested that in case of the catalyst of the invention, an organic aluminium halide, a titanium halide and an oxy-phosphorus compound together form a unique, novel coordination compound having a structure capable of stereospecifically coordinating propylene, and therefore with the catalyst a highly stereospecific polymer which could not be obtained with the conventional Ziegler type two-component catalyst can be produced.

According to the process of the invention, straight-chain olefins such as ethylene, propylene, n-butene-1, n-pentene-1, n-hexene-1; aliphatic olefins having a side-chain such as 3-methylbutene-1, 4-methylpenetene-1; cycloaliphatic olefins such as vinylcyclohexane; and aromatic olefins such as styrene, vinylnaphthalene, can be either singly or in mixtures polymerized to yield highly crystalline polymers. These polymers can be easily shaped in accordance with the conventional practices into various articles such as films and fibers, each possessing valuable utility. The invention is particularly suited for polymerization of α-olefins of 2–12 carbons. The process of the invention may be understood still better by reading the following examples.

Example 1

A 2-liter stainless steel autoclave was thoroughly removed of its atmospheric air, and 500 cc. of n-heptane, 20 mmols of titanium trichloride, 80 mmols of ethyl aluminium dichloride, and 35 mmols of phosphoryl chloride were added and mixed within the autoclave.

The autoclave was then heated to 70° C. and the contents were allowed to react and were continuously stirred for 30 minutes. Thereafter propylene was continuously introduced thereinto at 70° C., and was allowed to polymerize for 5 hours while the pressure was maintained at 5.0 kg./cm.$^2$ (gauge pressure).

After the polymerization, methanol was added to the polymeric mixture to decompose and remove the catalyst, and the remaining product was dried. Thus obtained polymer weighed 92 g., had an I.I. of 95.6%, and an intrinsic viscosity of 4.9 as measured in tetralin at 135° C. Further, in all of the following examples, the intrinsic viscosity was measured in the similar manner.

For comparison, the above experiment was repeated under the same conditions except that two-component catalyst prepared by omitting phosphoryl chloride from the aforesaid three components was used. Thereby only a small amount of oily or waxy polymer was obtained, and a crystalline polymer could not be obtained.

Example 2

A 2-litre stirred stainless steel autoclave was thoroughly removed of its atmospheric air, and then charged with 500 cc. of heptane, 10 mmols of titanium trichloride, 40 mmols of ethyl aluminium dichloride, and 20 mmols of phosphoryl chloride with mixing. Then 135 g. of propylene was introduced thereinto under an elevated pressure, heated to 70° C. and allowed to polymerize for 5 hours.

Thus obtained polymer weighed 85 g., had an I.I. of 95.0%, and an intrinsic viscosity of 5.4.

Example 3

Similar to the operations of Example 1, in a 2-litre autoclave, 20 mmols of titanium trichloride, 30 mmols of ethyl aluminium sesquichloride, and 13 mmols of phosphoryl chloride in 500 cc. of n-heptane were charged and allowed to react with continuous stirring. Propylene was continuously introduced thereinto at 70° C., and allowed to polymerize for 5 hours under the pressure maintained at 5.0 kg./cm.$^2$ (gauge pressure). Thus obtained polymer weighed 106 g., had an I.I. of 95.4% and an intrinsic viscosity of 5.6.

For comparison, the above experiment was repeated except that phosphoryl chloride was omitted from the catalyst. The polymer obtained weighed 68 g., had an I.I. of 87.6, and an intrinsic viscosity of 4.1.

Example 4

Under the same experimental conditions as of Example 1 except the third component of the catalyst used was replaced with phosphoryl bromide, propylene was allowed to polymerize. The resultant polymer weighed 102 g., had an I.I. of 94.8%, and an intrinsic viscosity of 4.8.

Example 5

A 100 cc. stainless steel autoclave was charged with 40 cc. of n-heptane as a solvent, and the atmosphere in the vessel was substituted by nitrogen. To the same, 3 mmols of titanium trichloride, 6 mmols of isobutyl aluminium dichloride, 3 mmols of phosphoryl chloride, and 12.5 g. of butene-1 were added, and allowed to polymerize for 5 hours at 50° C. with continuous shaking.

After the similar operation as of Example 1, 10.8 g. of white, solid polymer was obtained. When the polymer was extracted with ether, the residue was 93.5% of the original polymer. Again its intrinsic viscosity was 1.9.

For comparison, the two-component catalyst without addition of phosphoryl chloride was used under the same experimental conditions as the above, but no crystalline polymer was obtained.

Example 6

Similar to the operation of Example 5, a 100 cc. pressure bottle was charged with 40 cc. of n-heptane, and the atmosphere inside the bottle was substituted by nitrogen. To the same, 3 mmols of titanium tetrachloride, 6 mmols of isobutyl aluminium dichloride, 2.5 mmols of phosphoryl chloride, and 30 cc. of 4-methylpentene-1 were added and allowed to polymerize for 5 hours at 50° C.

Thus obtained polymer weighed 15.2 g. and had an I.I. of 94.0%.

For comparison, a similar experiment to the above was repeated except that the two-component catalyst was used with the omission of phosphoryl chloride. No crystalline polymer was obtained.

Example 7

Under the same experimental conditions as of Example 1, propylene was allowed to polymerize using a catalyst wherein ethyl aluminium dichloride was replaced with 40 mmols of phenyl aluminium dichloride. The polymer obtained weighed 75 g., had an I.I. of 87.5%, and an intrinsic viscosity of 4.7.

In case phenyl aluminium dichloride was replaced with n-octyl aluminium dichloride and benyl aluminium dichloride, a similarly effective result was obtained.

Example 8

By similar operations under similar conditions as of Example 6 except that titanium tetrachloride in the catalyst was replaced with titanium tetraiodide, 4-methylpentene-1 was allowed to polymerize. The polymer obtained weighed 14.4 g., and had an I.I. of 77.3%.

When titanium tetraiodide was replaced with titanium tetrabromide, a similarly effective result was obtained.

Example 9

Propylene was allowed to polymerize under the same experimental conditions as in Example 1 except in the catalyst titanium trichloride was replaced with 4 g. of titanium dichloride. The polymer obtained weighed 63 g., had an I.I. of 93.4%, and an intrinsic viscosity of 4.5.

Example 10

Propylene was allowed to polymerize under the same experimental conditions as in Example 3, except that the amount of phosphoryl chloride was reduced from 13 mmols to 7.5 mmols. The polymer obtained weighed 157 g., had an I.I. of 94.9%, and an intrinsic viscosity of 5.2.

Example 11

A 2-litre stirred stainless steel autoclave was thoroughly removed of its atmospheric air, and then charged with 500 cc. of n-heptane, 20 mmols of titanium trichloride, 80 mmols of ethyl aluminium dichloride, and 40 mmols of ethylphosphonyl dichloride. At 70° C. propylene was continuously introduced thereinto, and allowed to polymerize at 5 hours under the pressure maintained at 5 kg./cm.$^2$ (gauge pressure). After the polymerization, methanol was added to the polymeric mixture, and thereby the catalyst was separated and removed. The remaining product was dried. Thus obtained polymer weighed 174 g., had an I.I. of 92.7%, and an intrinsic viscosity of 4.7.

Example 12

Propylene was allowed to polymerize under the same operational conditions as in Example 11 except that phenylphosphonyl dichloride was used in place of ethylphosphonyl dichloride. The polypropylene obtained weighed 156 g., had an I.I. of 90.2%, and an intrinsic viscosity of 4.2.

Example 13

Propylene was allowed to polymerize under the same operational conditions as in Example 11 except that aluminium ethyl sesquichloride was used in place of ethyl aluminium dichloride. The polypropylene obtained weighed 164 g., had an I.I. of 91.2%, and an intrinsic viscosity of 4.5.

Example 14

To a 100 cc. pressure bottle, 40 cc. of n-heptane was added, and the atmosphere inside the bottle was substituted by nitrogen. To the same, 2 mmols of titanium trichloride, 8 mmols of ethyl aluminium dichloride, 4 mmols of ethylphosphonyl dichloride, and 30 cc. of 4-methylpentene-1 were added, and allowed to polymerize at 40° C. for 4 hours with continuous shaking. After the same treatments as described in Example 1, 19 g. of polymer was obtained, which had an I.I. of 92.3%, and an intrinsic viscosity of 8.5.

Example 15

Under the same operational conditions as in Example 5, 3 mmols of titanium trichloride, 6 mmols of n-propyl aluminium diiodide, 3 mmols of n-butylphosphonyl dichloride, 15 g. of butene-1, and 40 cc. of toluene were added to the autoclave, and allowed to polymerize at 50° C. for 5 hours with continuous shaking.

The polymer obtained weighed 11.5 g. The residue of the polymer after the ether extraction was 90.2% of the original polymer.

Example 16

Under the same operational conditions as in Example 1, propylene was allowed to polymerize with the use of a catalyst composed of 20 mmols of titanium trichloride, 50 mmols of methyl aluminium sesquibromide, and 10 mmols of n-butylphosphonyl dichloride. The polymer obtained weighed 145 g., had an I.I. of 94.8%, and an intrinsic viscosity of 4.9.

Example 17

Propylene was allowed to polymerize under the same conditions as in Example 11, except that the amount of ethylphosphonyl dichloride was increased from 40 mmols to 55 mmols. The polymer obtained weighed 31 g., had an I.I. of 92.3%, and an intrinsic viscosity of 5.1.

Example 18

A 500 cc., three-necked flask was charged with 150 cc. of toluene, and its inside atmosphere was thoroughly substituted by nitrogen. To the same, 20 mmols of phenyl aluminium dichloride, 14 mmols of phenylphosphonyl dichloride, and 5 mmols of titanium trichloride were added by the stated order, and allowed to react at 50° C. for an hour with continuous stirring. Thereafter 70 g. of styrene were gradually added thereto by means of a dropping funnel, and allowed to polymerize for 5 hours. The polymeric mixture obtained was treated similarly as described in Example 1, thereby 64 g. of white, crystalline polymer was obtained.

We claim:

1. Process for the polymerization of olefinic hydrocarbons which comprises polymerizing one or more α-monoolefinic hydrocarbons having 2–12 carbon atoms in the presence of a three-component combination catalyst composed of (1) an organic aluminium dihalide or an organic aluminium sesquihalide or their mixture, (2) one or more of titanium halides, and (3) one or more of oxy-phosphorus compounds represented by the following Formulae I and II below:

$$POX_3 \qquad (I)$$

$$RPOX_2 \qquad (II)$$

wherein X stands for a halogen,
and R is a hydrocarbon group of 1–12 carbons.

2. Process for the polymerization of olefinic hydrocarbons which comprises contacting one or more α-monoolefinic hydrocarbons having 2–12 carbon atoms with a catalyst at a temperature of about 0°–250° C., under a pressure ranging from atmospheric to 100 atmospheres, said catalyst being the three-component combination catalyst prepared by mixing (1) an organic aluminium dihalide or an organic aluminium sesquihalide, or a mixture thereof, (2) one or more of titanium halides, and (3) one or more of oxy-phosphorus compounds represented by the Formulae I and II below:

$$POX_3 \qquad (I)$$

$$RPOX_2 \qquad (II)$$

wherein X stands for a halogen,
and R is a hydrocarbon group of 1–12 carbons in the presence of an organic inert solvent at a temperature within the range of about −50°–+200° C.

3. The process for the polymerization of olefinic hydrocarbons as set forth in claim 1, wherein as the catalyst that was prepared by mixing (1) an organic aluminium dihalide or an organic aluminium sesquihalide, or their mixture, (2) one or more of titanium halides, and (3) one or more of oxy-phosphorus compounds in the presence of an organic inert solvent, the ratio between the first and the second component being, in terms of mol ratio between Al and Ti, 0.1–10, and that between the third component and the first component being, in terms of mol ratio between P and Al, 0.1–1.0.

4. Process for preparation of polypropylene which comprises under polymerization conditions contacting propylene wtih a catalyst prepared by mixing ethyl aluminium dichloride, titanium trichloride, and phosphoryl chloride (POCl$_3$) in the presence of an organic inert solvent.

5. Process for preparation of polypropylene which comprises under polymerization conditions contacting propylene with a catalyst prepared by mixing ethyl aluminium sesquichloride, titanium trichloride, and phosphoryl chloride (POCl$_3$) in the presence of an organic inert solvent.

References Cited

UNITED STATES PATENTS 2,969,345   1/1961   Coover et al. _____ 260—93.7

FOREIGN PATENTS 608,467   3/1962   Belgium.
1,231,089   9/1960   France.
1,000,348   8/1965   Great Britain.
637,449   3/1964   Belgium.

OTHER REFERENCES

Journal of Polymer Science, 51, 387–397, 1961 QD, 281, P6J6 (pages 392–394 relied on).

JOSEPH L. SCHOFER, *Primary Examiner.*

M. B. KURTZMAN, *Assistant Examiner.*